United States Patent [19]

Gardner et al.

[11] 4,127,854
[45] Nov. 28, 1978

[54] BACK-UP AND ALARM CIRCUIT SYSTEM

[75] Inventors: Mark R. Gardner, Champaign, Ill.; Hazle M. Rasmussen, 113 East St., Penfield, Ill. 61862

[73] Assignee: Hazle Mary Rasmussen, Penfield, Ill.

[21] Appl. No.: 748,872

[22] Filed: Dec. 9, 1976

[51] Int. Cl.² .................... G08B 21/00; H05B 1/02
[52] U.S. Cl. ..................... 340/640; 219/487;
 219/506; 219/508; 307/39; 307/131; 340/652;
 340/664
[58] Field of Search ............ 340/253 C, 256, 251;
 307/38, 39, 125, 126, 130, 131; 219/321, 486,
 487, 506, 508; 315/88, 89, 90, 91, 93

[56] References Cited
U.S. PATENT DOCUMENTS

| 3,562,580 | 2/1971 | Blomgren | 340/251 X |
| 3,611,432 | 10/1971 | Babcock et al. | 340/251 X |
| 3,659,146 | 4/1972 | Munson | 315/93 X |
| 4,010,457 | 3/1977 | Simpson | 340/248 C X |

Primary Examiner—John W. Caldwell, Sr.
Assistant Examiner—Daniel Myer
Attorney, Agent, or Firm—David V. Munnis

[57] ABSTRACT

Safety back-up and alarm circuit for loads such as electrical heaters and the like comprising a back-up substitute load for the primary load, e.g., an electric heater, switching circuits responsive to outputs from the primary and back-up loads, and which automatically replace the primary load with the back-up load upon failure of the primary load, said switching circuits including a circuit which reliably reads the output from the primary load and distinguishes failure of the primary load from mere non-load -- including impedance in the primary load circuit, a primary alarm element, e.g. a lamp, bell, or buzzer responsive through said switching circuits to a failure of the primary load and an energizing of the back-up load and a secondary alarm element, e.g. a bell or buzzer responsive to a failure of said back-up element.

3 Claims, 2 Drawing Figures

BACK-UP AND ALARM CIRCUIT SYSTEM

BACKGROUND OF THE INVENTION

Numerous systems exist in the art wherein electrically operable elements, e.g., heating elements, valves, pumps, blowers, and like, must be available for operation on a continuous basis to ensure satisfactory operation of the over-all system which would produce disastrous results in terms of damage to other equipment in the system and the like. Various techniques have been proposed to overcome or minimize the problems due to a failure of such a "key" operable element. Such prior techniques, however, have suffered from one or more drawbacks commercially in being unable to distinguish adequately the primary load's failure, unduly complex and expensive, requiring supplemental power sources, and/or not providing a satisfactory alarm of the failure of the primary element.

Accordingly, the art has continued to search for simple and inexpensive, reliable back-up and alarm systems for use with "key" electrically operable elements.

OBJECTIONS OF THE PRESENT INVENTION

Accordingly, the primary object of the present invention is to provide an improved back-up and alarm circuit system for use with "key" electrically operable elements, such as electrically operated heaters and the like.

Another object of the present invention is to provide a back-up and alarm circuit system for use with "key" electrically operable elements such as electric heaters, which operates automatically and reliably upon the failure of the primary "key" element to provide a substitute back-up element for the failing primary element and automatically provides a reliable alarm of the failure of the primary element and any failure of the back-up element.

An additional object of the present invention is to provide a reliable, back-up and alarm circuit system for use in conjunction with "key" electrically actuatable elements which is simple in construction and inexpensive to operate and maintain.

BRIEF DESCRIPTION OF THE DRAWING

The above and other objects are satisfied by the back-up and alarm circuit system of the present invention which is described more fully hereinafter with reference being made to the attached drawings of which FIGS. 1 and 2 each are schematic circuit diagrams of two different specific embodiments thereof showing their use in connection with electrically actuatable heating elements of the type used to heat water lines in mobile homes and preclude such water lines from freezing.

DETAILED DESCRIPTION OF THE INVENTION

Figure 1:
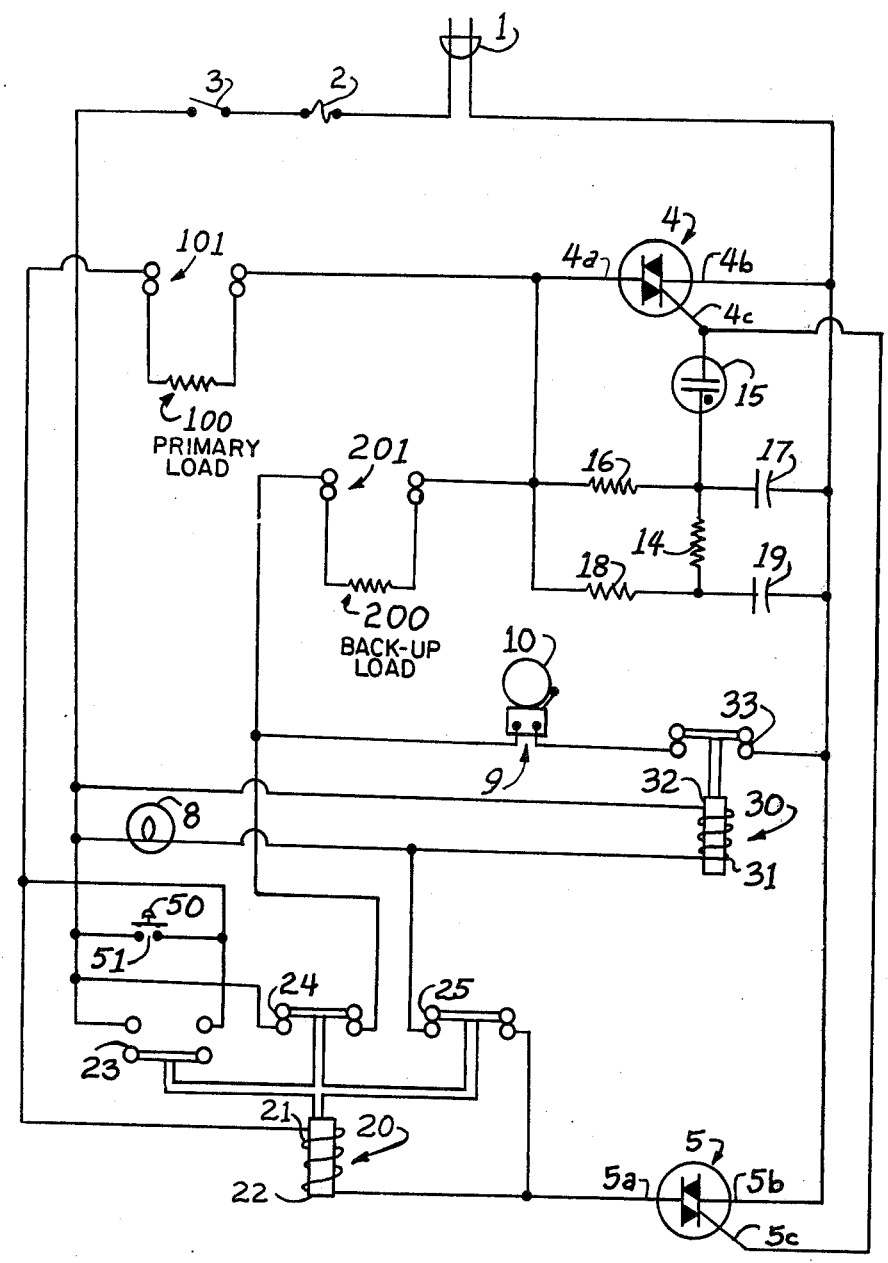

With particular reference to the attached drawing bearing the notation of FIG. 1, element designated generally numeral 100 is an electrically actuatable heating element normally employed to heat water lines of mobile homes to prevent same from freezing, ie., an electric heat tape. In accordance with the system of the present invention, heating element 100 is operatively connected in the system in a connection 101 positioned in a circuit adapted to receive AC current via a conventional plug 1 and containing a main on-off switch element 3 and a fuse or circuit breaker element 2. Connected in the system is a relay element 20 having a sensing component, shown by solenoid component coil 21 around core 22, connected in parallel with and adapted to sense impulses in the circuit containing heater 100. Lamp driver elements 4 and 5 are provided and connected in series with each of heater element 100 and relay sensing coil 21, respectively, with input currents 4c and 5c of elements 4 and 5, respectively, being operatively connected also to energize a lamp element 15 connected in series therewith. As shown, lamp driver elements 4 and 5 are both triacs operatively connected such that when there is input current to connections 4a and 5a and triggers 4c and 5c thereof, respectively, current flows through elements 4 and 5 from connections 4b and 5b thereof, respectively.

Relay element 20 is adapted to supply at least three separate outputs, shown at connections 23, 24, and 25. Relay 20 is operatively connected in the circuit system of the present invention such that connection 23 delivers output pulses to heating element 100 and sensing element 21 of relay 20 and that, when sensing element 21 of relay 20 senses no current, connection 23 delivers no output and connections 24 and 25 both deliver output pulses, and that, when sensing element 21 of relay 20 senses current, connection 23 delivers output pulses and connections 24 and 25 deliver no output pulses, provided, in the case of connections 24 and 25 that the respective circuits in which they are positioned are conducting, as hereinafter described.

Connection 24 of relay element 20 is operatively connected in the circuit system of the present invention in parallel with heating element 100 and sensing element 21 of relay 20 and in series with a back-up heating element 200, connected into the circuit through connection 201. Output from heating element 200 provides input to lamp driver element 4 at connection 4a and to trigger 4c through element 5. Output from connection 24 also provides input to a connection 9 for an alarm element, e.g. an electrically actuatable bell, shown as element 10, and to an output connection 33 of a second relay 30. Connection 24 receives input from main on-off switch 3.

Connected in series with main on-off switch 3 and in parallel with connections 23 and 24 relay 20 is a lamp element 8, which also provides input to connection 5a of lamp driver 5 through connection 25 of relay 20, connection 25 being connected in series therewith.

Also connected in series with main switch 3 and in series with connection 25 of relay 20 is a sensing element 31 of relay 30, sensing element 31 as shown being a winding around core 32 of solenoid element 30. Sensing element 31 is connected in series with connection 5a of lamp driver 5 through connection 25 of relay 20.

A reset switch 50 provided in the system through a connection 51 is connected in series with on-off switch 3 and sensing element 21 of relay 20.

In operaton the back-up and alarm circuit system of the present invention operates as follows:

Plug 1 is inserted into a conventional source of AC (not shown), and the circuit systems are in the positions shown in FIG. 1 with reset switch 50 being open, sensing element 21 of relay 20 being non-conducting causing output connection 23 to be open and output connections 24 and 25 to be closed, and sensing element 31 of relay 30 to be conducting (i.e. providing element 200 is present and operating, otherwise it is non-conducting) thereby opening output connection 33. Reset button 50 is then closed, energizing thereby sensing element 21 of relay 20, closing output connection 23, and opening output connections 24 and 25 of relay 20. By output connection 23 providing input to sensing element 21, reset button may be released and connection 51 opened without changing the state of the sytem. In this state, current is delivered to heating element 100, and to and through lamp drivers 4 and 5, and lamp 15 is illuminated until element 100 fails.

When heating element 100 fails, sensing elements 4 and 5 become non-conducting, due to a loss of trigger currents 4c and 5c sensing element 21 of relay 20 is de-energized, and output connections 24 and 25 are closed, with the result that heating element 200 becomes energized and substitutes for primary element 100, illumination element 15, is energized and lit, elements 4 and 5 conduct, illumination element 8 becomes lit, and sensing element 31 of relay 30 is energized, keeping connection 33 open. Illumination element 8 provides a visual indication that the back-up heating element 200 is operating and primary heating element needs to be repaired or replaced.

When heating element 200 fails, with the system in the above described condition, element 5 ceases to conduct (i.e. element 15 is de-energized and trigger current 5c ceases) and relay 30 is de-energized, closing connection 33 and energizing alarm element 10 which signals that no heating element is then operational.

In the back-up and alarm circuit of the present invention, circuit means are provided which reliably distinguish between load failure and mere non-load - including capacitance in the load circuits. In the embodiment shown in FIG. 1, such circuit means are provided by element 15, optionally and preferably in combination with resistors 14, 16, and 18, and capacitors 17 and 19 connected as shown, being a neon light or equivalent "diac" being connected in series with the outputs of loads 100 and 200, and so that the output of element 15 provides the trigger currents 4c and 5c to elements 4 and 5, respectively. Thus, there must be sufficient current through load 100 or 200 to trigger element 15 and element 15 is selected such that its trigger threshold exceeds current and voltage levels found in the load circuits on load failure.

Figure 2:
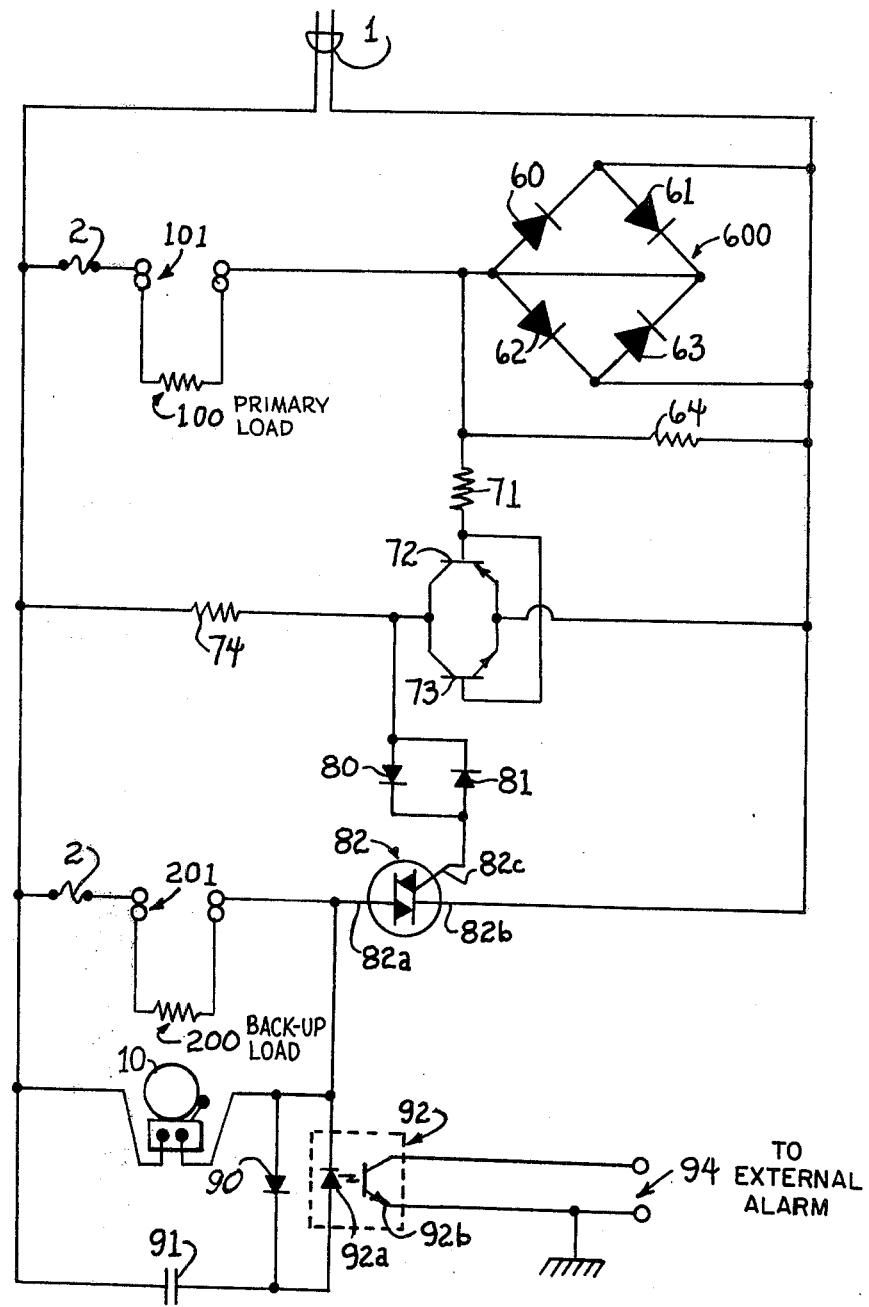

In the embodiment of the back-up and alarm circuit of the present invention shown in FIG. 2, like numerals depict like elements illustrated in FIG. 1.

With reference to FIG. 2, a fuse 2 is positioned in series with each of loads 100 and 200 for extra protection against short-circuiting in the respective load lines. Connected in series with load 100 is a cross-coupled bridge 600 of diodes 60, 61, 62, and 63 which generates a clipped voltage. The level of magnitude of such voltage is selectively held down for given levels of loads 100 by resistor 64 connected in parallel therewith, thereby by predetermined selection fixing the power threshold load connection 101, and preventing merely capacitive loads on connection 101 (as from a long extension cord) when load 100 has failed, from causing the circuit to behave as if load failure had not occurred. The circuit means provided by bridge 600 and resistor 64 provides thereby a reliable sensing means for load 100 failure.

The voltage across bridge 600 is applied through resistor 71 to the bases of transistors 72 and 73, connected as shown in FIG. 2. This causes a base current to flow into transistors 72 and 73, a current in 72 on positive half cycles and in 73 on negative half cycles. This is because 72 is NPN and 73 is PNP, and the same are forward biased in the respective half-cycles described and reverse biased (and hence non-conducting) in the opposite half cycles. During the respective half-cycle in which each transistor 72 and 73 draws base current, the transistor saturates, shunting to its respective emitter the current flowing to it through a resistor 74 connected in parallel to load 100. This later current is positive while transistor 72 is saturating with the positive half cycle current, and is thus of appropriate polarity for 72 to shunt to its emitter. Similarly, the current through resistor 74 is negative during negative half cycles, and transistor 73 can shunt the current to its emitter.

With the current through resistor 74 being shunted to the emitters of transistors 72 and 73, no current can flow through diodes 80 and 81 connected to receive output from resistor 74. However, if there is no current flow through load 100, i.e. it has failed, then no base current flows in transistors 72 and 73, the current through resistor 74 is not shunted, but must flow through diodes 80 and 81 (depending on the respective half cycle) into the gate 82c of a triac 82, connected to the output of diodes 80 and 81 and cause triac 82 to conduct. With triac 82 conducting, power automatically is applied to back-up load 200, and to an alarm circuit provided to signal by activating signal means, e.g., lamps or buzzers, bells, etc., failure of primary load 100.

The alarm circuitry suitably may include a transformer (not shown) to drive a low-voltage buzzer, for example. Provision also suitably may be made for applying power (low voltage) from such a transformer to an external device, buzzer, lamp, etc., (not shown) by inserting a shorting jack into the alarm circuit. Plugging such an external alarm device in this jack would silence an alarm in the local circuit and provide a means of detecting primary load 100 failure and back-up load siwtch-over at a location remote from the loads.

In the alarm circuit shown in FIG. 2, the buzzer (a high voltage unit) 10 is driven directly by the output of triac 82, and a transformer is eliminated. In the embodiment shown, a self-powered external alarm is provided by the inclusion of an optical isolator circuit 92. The isolator has an emitting diode 92a responsive to output from triac 82, and current in emitting diode 92a is limited by a capacitor 91 in series therewith, and the voltage across diode 92a is limited in the reverse direction by diode 90 in parallel therewith. Diode 92a will illuminate transistor 92b of isolator 92 whenever the local alarm 10 is sounding, causing transistor 92b to saturate at a 60 HZ rate. This condition can be detected by an external device (self-powered, not shown) plugged into connection 94 and cause the sounding of an external alarm (not shown). The local buzzer 10 in such an embodiment is not disabled when an external device is plugged into connection 94.

The entire circuit of the present invention suitably may be packaged in any available container and, for example, be provided with two power outlets for the primary and back-up loads, and a switch slot opening behind which buzzer 10 is positioned. Supplemental means, such as clamps and the like, may be provided whereby the containers holding the circuit may be mounted on a support.

We claim:

1. A safety back-up and alarm system circuit for electrical loads comprising means for connecting said circuit to a power source, circuit means for connecting a primary electrical load, circuit means for connecting a secondary back-up electrical load, switching circuit means responsive to the output from said primary load connection, which deliver power to said primary load connection when a load is inserted therein and is functioning and when said primary load is functioning fails to deliver power to said secondary back-up load connection and which, upon failure of said primary load, automatically delivers power to a secondary back-up load inserted in said secondary back-up load connection, said switching circuit means including current-sensing impedance means and at least one relay element connected to receive output from said impedance means, to, when energized, shunt current from said secondary load connection, and to, when de-energized, provide power to said secondary load connection, said impedance means being connected in series with said primary load connection and being adapted to control threshold current in said primary load circuit at a predetermined level and to distinguish between failure of said primary load and mere capacitance load in said primary load circuit and said impedance means being connected to, when conducting, energize said relay element and to, when non-conducting, de-energize said relay element and signal means responsive to an output signal from said switching circuit which signals failure of said primary load.

2. The safety back-up and alarm system circuit according to claim 1 wherein said current-sensing impedance means for said switching circuit means includes a diac and at least one triac connected with the output from said diac providing the trigger current for said triac, and wherein said switching circuit means is responsive to output from said triac.

3. The safety back-up and alarm system circuit according to claim 2 wherein said current-sensing impedance means for said switching circuit means includes a cross-coupled diode bridge and a resistor connected in parallel therewith.

* * * * *